US008375775B2

(12) United States Patent
Lilienkamp et al.

(10) Patent No.: US 8,375,775 B2
(45) Date of Patent: Feb. 19, 2013

(54) METHOD FOR DETERMINING THE POWER OF AN INTERNAL COMBUSTION ENGINE

(75) Inventors: Thorsten Lilienkamp, Bremen (DE); Christian Rohde, Bremen (DE)

(73) Assignee: Thyssenkrupp Krause GmbH, Bremen (DE)

( * ) Notice: Subject to any disclaimer, the term of this patent is extended or adjusted under 35 U.S.C. 154(b) by 153 days.

(21) Appl. No.: 12/979,441

(22) Filed: Dec. 28, 2010

(65) Prior Publication Data

US 2011/0174065 A1    Jul. 21, 2011

(30) Foreign Application Priority Data

Jan. 18, 2010  (DE) .......................... 10 2010 004 935
Mar. 25, 2010 (DE) .......................... 10 2010 012 649

(51) Int. Cl.
*G01M 15/04*    (2006.01)
(52) U.S. Cl. .................................................. 73/114.15
(58) Field of Classification Search ............... 73/116.01, 73/116.02, 116.05
See application file for complete search history.

(56) References Cited

U.S. PATENT DOCUMENTS

| | | | | |
|---|---|---|---|---|
| 3,834,221 A * | 9/1974 | Swis et al. ................. | 73/116.02 |
| 3,942,363 A | 3/1976 | Swis | |
| 4,331,029 A * | 5/1982 | Wilson ........................ | 73/114.29 |
| 4,633,707 A * | 1/1987 | Haddox ............................. | 73/47 |
| 5,355,713 A * | 10/1994 | Scourtes et al. ........... | 73/114.76 |
| 5,780,730 A * | 7/1998 | Scourtes et al. ........... | 73/114.37 |
| 6,802,207 B2 * | 10/2004 | Okuda et al. ............... | 73/114.01 |
| 6,910,369 B2 * | 6/2005 | Okuda et al. ............... | 73/114.28 |
| 6,986,292 B2 * | 1/2006 | Kemnade ................. | 73/862.191 |
| 7,096,746 B2 * | 8/2006 | Kemnade ................. | 73/862.191 |
| 2003/0164029 A1* | 9/2003 | Okuda et al. .................... | 73/116 |
| 2005/0016295 A1* | 1/2005 | Kemnade ................... | 73/862.28 |
| 2005/0199048 A1* | 9/2005 | Kemnade ........................ | 73/112 |

FOREIGN PATENT DOCUMENTS

WO   03/054502 A1   7/2003

OTHER PUBLICATIONS

European Patent Office Search Report (May 20, 2011).

* cited by examiner

*Primary Examiner* — Freddie Kirkland, III
(74) *Attorney, Agent, or Firm* — Laurence P. Colton; Smith Risley Tempel Santos LLC

(57) ABSTRACT

The power of internal combustion engines is conventionally determined on special power-test stands on which all connections, in particular coolant connections, of the engine must be fitted. In particular, if a cold test of the internal combustion engine is carried out beforehand, it is necessary for said internal combustion engine to be dismounted from the cold-test stand and mounted on the power-test stand, which is time-consuming. The invention indirectly predetermines the power of the internal combustion engine during the cold test. In this way, the determination of the power can be carried out on the cold-test stand without the need for a power-test stand or for the internal combustion engine to be mounted thereon.

20 Claims, 1 Drawing Sheet

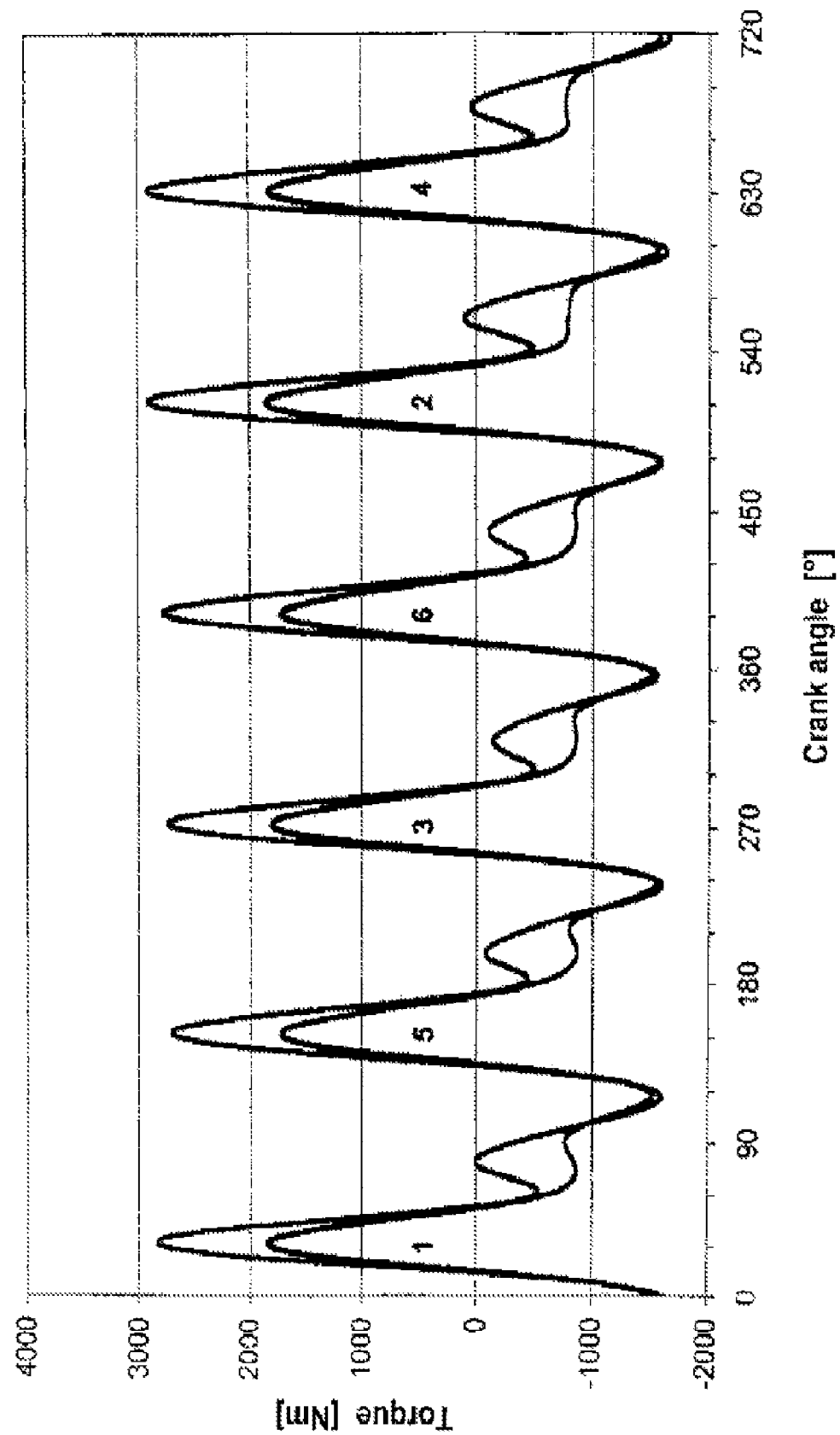

METHOD FOR DETERMINING THE POWER OF AN INTERNAL COMBUSTION ENGINE

STATEMENT OF RELATED APPLICATIONS

This patent application is based on and claims the benefit of German Patent Application No. 10 2010 004 935.2 having a filing date of 18 Jan. 2010 and German Patent Application No. 10 2010 012 649.7 having a filing date of 25 Mar. 2010, both of which are incorporated herein in their entireties by this reference.

BACKGROUND OF THE INVENTION

1. Technical Field

The invention relates to a method for determining the power of an internal combustion engine.

2. Prior Art

It is conventional for internal combustion engines, specifically both diesel and spark-ignition engines, to be tested by means of a so-called cold test. Said cold test takes place with the internal combustion engine in the unfired state. That is to say the internal combustion engine is driven in a dragging manner in the cold test, and no injection of fuel takes place. With the cold test, it is possible to determine only basic functionalities of the engine, for example the leaktightness, control times and the functionality of sensors and actuators.

It is often also desirable to determine the power of the internal combustion engine during the testing thereof. A separate power-test stand is required for this purpose. Furthermore, the power test is associated with a large amount of expenditure, because the internal combustion engine to be tested in each case must be dismounted from the cold-test stand and mounted on the power-test stand, and all required connections must be fitted.

BRIEF SUMMARY OF THE INVENTION

The invention is based on the object of providing a method for determining the power of the internal combustion engine, which method can be implemented in a simple and reliable manner with little expenditure.

A method for achieving said object is a method for determining the power of an internal combustion engine, wherein in conjunction with the cold test, the internal combustion engine is operated briefly in the fired state, torque values are determined in said fired state, and from the torque values thus determined, the power of the internal combustion engine is indirectly determined mathematically. Accordingly, it is provided that, during the cold test, in particular at the end of the cold test or subsequently to the cold test with the internal combustion engine in the unfired state, the internal combustion engine is tested briefly in the fired state, that is to say operated with fuel injection, specifically preferably below the nominal rotational speed. The torque of the internal combustion engine is measured during said test, from which torque the expected power of the internal combustion engine is determined mathematically. The method according to the invention makes it possible to indirectly predict the power of the tested internal combustion engine without the need for said internal combustion engine to be tested on a power-test stand for this purpose.

It is preferably provided that the power of the internal combustion engine is determined on the cold-test stand. The internal combustion engine may for this purpose remain on the cold-test stand, such that the determination of the power takes place during the cold test of the internal combustion engine. It is provided in particular that, subsequently to the cold test with the internal combustion engine in the unfired state, the power of the internal combustion engine briefly operated in the fired state, with an injection of fuel, is determined on the cold-test stand. The determination of the power of the internal combustion engine thereby takes place practically during the cold test.

In a preferred refinement of the method, the torque for predicting the power of the internal combustion engine during the brief operation thereof with fuel injection, that is to say with the internal combustion engine in the fired state, is generated at a constant rotational speed or at a rotational speed that lies in a narrow rotational speed spectrum. Here, it is possible to record a plurality of measured values, in particular torque values, which would theoretically have to be equal on account of the operation with constant or virtually constant rotational speed. If deviations arise here, wherein these may be only minor deviations, then to determine the power of the internal combustion engine, a mean value can be formed from the recorded series of a plurality of torque values. In this way, the power of the internal combustion engine can be predicted with relatively high accuracy.

In one advantageous refinement of the method, no active cooling, in particular external cooling such as for example water cooling, of the internal combustion engine takes place during the brief period of fired operation of the internal combustion engine which is carried out for the determination of the power. During the brief period of fired operation which is sufficient for determining the power, the internal combustion engine does not warm up enough to necessitate external cooling. This is true in particular if the determination of the power takes place at a low rotational speed of the internal combustion engine which lies below the nominal rotational speed thereof, and preferably only in the region of the idle rotational speed. Said idle rotational speed may lie in the range from 300 to 800 rpm.

The method may be refined such that a motor, preferably an electric motor, which serves to drive the internal combustion engine in a dragging manner during the unfired cold test is also used as a starter for starting the internal combustion engine for the fired cold test. It is also preferably provided that the motor remains coupled to the internal combustion engine, in particular to the flywheel thereof, during preferably the entire fired cold test after the internal combustion engine has been started. During the fired cold test, the motor, in particular the electric motor, is then driven or dragged along at idle by the internal combustion engine when the electric motor is switched into the currentless state during the fired cold test of the internal combustion engine. The electric motor is preferably used as a braking motor during the fired operation of the internal combustion engine. The electric motor is then operated in a generative manner. Here, it is possible to use the electric motor to determine the torque of the internal combustion engine operated briefly in the fired state in the cold test. In the procedure described above, the electric motor or some other motor performs a plurality of functions depending on whether the internal combustion engine is being operated in the unfired or fired cold test. A clutch for separating the electric motor from the internal combustion engine may then be dispensed with.

It is also provided, if appropriate, that the fired operation of the internal combustion engine to determine the torque be carried out without a turbocharger. The internal combustion engine is accordingly operated purely as a naturally aspirated engine during the determination of its power. Here, the turbocharger does not influence the measurement result. The operation of the internal combustion engine without the turbocharger nevertheless permits a reliable prediction of the power.

The method according to the invention may advantageously be refined such that, subsequently to the first section of the cold test which takes place with the internal combustion engine in the unfired state, the internal combustion engine is operated briefly in the fired state only if the cold test in the unfired state has yielded that the basic functionalities of the internal combustion engine lie within admissible tolerances. Accordingly, the determination of the power and the associated brief period of fired operation of the internal combustion engine are omitted if, in the unfired cold test, the internal combustion engine has already been found not to be in order on account of the lack of basic functionalities. In this way, the determination of the power, which is no longer necessary, can be omitted.

In one advantageous refinement of the method, it is provided that the power of the internal combustion engine is predicted by taking into consideration a mean torque profile of the torque determined in the cold test with the internal combustion engine in the unfired state, and taking into consideration the torque determined subsequently thereto with the internal combustion engine in the fired state. The mean torque values determined in this way permit a reliable, indirect prediction of the power of the tested internal combustion engine. This is true in particular when the mean torque profile for predetermining the power of the internal combustion engine is calculated from a statistical mean value of a plurality of measured torque values during the cold test of the engine both in the unfired state and also in the fired state.

It is also preferably provided that the net total power, the gross total power and/or the power loss of the internal combustion engine are/is determined from the mean torque profile. Some or all of said power values permit a meaningful prediction of the power of the tested internal combustion engine.

If appropriate, the method according to the invention may be refined such that the power of the internal combustion engine is determined selectively for individual cylinders, in particular each individual cylinder. In this way, statements can be made regarding the later running characteristics and the service life of the internal combustion engine, or expected abnormalities of certain cylinders.

The expected power of the individual cylinders is preferably determined in the cold test by determining the cylinder-specific differential area of the torque measurement in the unfired cold test and in the fired cold test. Here, the differential area is the area calculated mathematically, in particular as an integral, from the plotted torque profiles of each cylinder.

BRIEF DESCRIPTION OF THE DRAWING

A preferred exemplary embodiment of the invention will be explained in more detail below with reference to the single FIGURE of the drawing. Said drawing illustrates the torques, determined in relation to the crank angle of two crankshaft rotations, during the cold test of the internal combustion engine without injection (unfired) and with injection (fired).

DETAILED DESCRIPTION OF PREFERRED EMBODIMENTS

The invention will be explained in conjunction with the determination of the power of an internal combustion engine designed as a six-cylinder diesel engine. The invention is however also suitable for any other types of internal combustion engine.

The power of the diesel engine is not determined directly on a power-test stand but rather, according to the invention, is determined indirectly by virtue of the power of the tested diesel engine being predicted. The indirect determination or prediction of the power of the internal combustion engine takes place, according to the invention, in conjunction with a cold test of the diesel engine.

The cold test of the diesel engine takes place on a cold-test stand. On said cold-test stand, the diesel engine is firstly tested in the dragged, unfired state without fuel injection. For this purpose, the diesel engine is for example driven in a dragging manner via the flywheel by an electric motor belonging to the cold-test stand. Here, the diesel engine has fitted to it only the components required for the cold test, which components however also enable the diesel engine to be operated briefly in the fired state, that is to say with diesel injections. Here, external cooling of the diesel engine does not take place, such that no coolant connections are required for the cold test, and specifically in particular also in a phase of the cold test in which the diesel engine is operated in the fired state. Also, for the cold test of the diesel engine including the power determination thereof, the turbocharger (or if appropriate a plurality of turbochargers) is either not yet fitted or (if already fitted) is at any rate not in an operationally ready state.

To determine the torque of the diesel engine at the crankshaft or flywheel in both the unfired cold test phase and also the fired cold test phase, a torque sensor is provided which is arranged at a suitable location of the crankshaft or of the flywheel, preferably between the electric motor for driving the diesel engine in a dragging manner in the unfired cold test and the flywheel. Furthermore, the crankshaft or the flywheel is assigned a travel sensor for the crank angle. Said travel sensor may be integrated into the torque sensor, such that a torque-travel sensor is arranged between the electric motor and the flywheel.

To carry out the method according to the invention, a computer is also required which stores the crank-angle-related torque values during the fired and unfired operation of the diesel engine to be tested, records said values, if appropriate forms mean values of a plurality of measured torque values, and evaluates these. The evaluation of the crank-angle-related measured torque values during the fired and unfired operation of the diesel engine is carried out in order to determine, mathematically, a predicted power of the tested diesel engine, wherein predicted values are obtained because the determination of the power is carried out in the cold test.

The procedure of the method according to the invention is as follows:

On the cold-test stand, the diesel engine firstly undergoes an unfired cold test without diesel injection. In said cold test, the diesel engine is driven in a dragging manner by an electric motor of the cold-test stand. In the cold test, conventional basic functionalities of the diesel engine are checked in the dragged internal combustion engine. These basic functionalities are in particular the leaktightness of the combustion chamber, control times and the function of the sensors and actuators of the diesel engine.

Furthermore, in the dragged, unfired test of the diesel engine, the torque of the crankshaft or at the flywheel of the diesel engine is determined in relation to the crankshaft angle. The torque is preferably determined separately for each individual cylinder of the diesel engine. The determination of the torque is carried out preferably over a plurality of working strokes of the diesel engine. From the torque values obtained in this way, mean values of the torque are determined and preferably recorded in relation to the crank angle for the individual cylinders without injection, that is to say in the unfired diesel engine.

The cold test of the diesel engine without an injection of diesel fuel may take place with a turbocharger or turbochargers either mounted or dismounted. The cold test of the unfired diesel engine takes place at rotational speeds conventional for cold tests, which generally lie below the nominal rotational speed.

Subsequently to the cold test of the diesel engine without an injection of diesel fuel, a brief cold test is carried out on the cold-test stand in the fired operation of the diesel engine, with an injection of diesel fuel. This fired test operation is carried out on the cold-test stand without external cooling of the diesel engine. Said short fired test phase of the diesel engine is therefore also referred to as a cold test.

The electric motor for driving the diesel engine in a dragging manner in the unfired cold test is used as a starter for starting the diesel engine for the fired cold test. After the diesel engine has been started by the electric motor, the electric motor—in contrast to conventional starters—remains coupled to the diesel engine, preferably to the flywheel thereof. During the fired cold test, the electric motor is then co-rotated by the diesel engine when the electric motor is in the currentless state.

It is preferably provided that the electric motor is operated in a generative manner as a braking motor during the fired cold test of the diesel engine. The braking motor can then be used for determining the torque of the diesel engine. Here, it may be sufficient for the diesel engine to be braked only lightly by the electric motor, that is to say not to be braked to the same extent as is conventional on power-test stands on which internal combustion engines are operated in the fired state with external cooling. In the method according to the invention, in which the diesel engine is operated only briefly in the fired state without external cooling in the so-called cold test, it is not necessary for the diesel engine to be braked in the conventional way as on power-test stands, because the power determination takes place according to the invention in a different way. Furthermore, in the fired cold test in the method according to the invention, the diesel engine is tested not at its nominal or maximum rotational speed but rather at relatively low rotational speeds.

The cold test with the diesel engine in the fired state takes place without turbochargers, or with non-operational turbochargers. The diesel engine is therefore operated as a naturally aspirated engine in the fired cold test.

The fired cold test of the diesel engine takes place only during a few working strokes at a constant rotational speed. Said rotational speed lies below the nominal rotational speed. The cold test in the fired diesel engine takes place preferably approximately at the idle operating point. This lies in particular at rotational speeds in the range from 300 to 800 rpm. No significant heating of the already still-cold diesel engine takes place during the short fired cold test phase at this low rotational speed.

In the cold test of the fired diesel engine with diesel fuel injection, the torque of the diesel engine at the crankshaft or the flywheel is also determined, specifically at constant rotational speed in the abovementioned range. Measured torque values are determined in relation to the crank angle over a plurality of working strokes, specifically preferably for each individual cylinder.

The FIGURE illustrates the torque profile over the crank angle for each individual cylinder of the diesel engine, specifically in the unfired state without injection and in the fired state with injection. The upper curve with the higher peak values depicts the torque recorded during the cold test of the fired diesel engine, while the lower curve with relatively low maximum values depicts the torque profile determined during the cold test without injection. Illustrated in the FIGURE are six maxima of the torque profile, with each maximum documenting the torque, in relation to the crank angle, of a (different) cylinder of the diesel engine which, in the exemplary embodiment shown, has six cylinders. From the ignition sequence of the diesel engine, it is possible to distinguish which cylinder is represented in each case. The measured values shown are mean values that have been determined from the measured torques over a plurality of working strokes of the diesel engine. Five working strokes are generally sufficient. The measurement however advantageously takes place over an even greater number of working cycles, specifically up to 10 working cycles.

The indirect predetermination of the power is carried out, as a prediction of the power, from the mean torque values, recorded during the unfired and fired cold tests, in relation to the crank angle for a working stroke. For this purpose, the differential area illustrated in the FIGURE between the torque profiles with and without firing of the diesel engine is calculated in a cylinder-selective manner, that is to say for each individual cylinder. From said differential area, the predicted power is determined for each cylinder by means of interpolation. This yields a prediction of the full-load power of the diesel engine, even though this has been tested in the cold test, specifically in the unfired and fired states, only in the region of the idle rotational speed.

In the calculation of the expected power of the diesel engine, the full-load power is calculated, as a function of the gross power, from the differential area of the torque values determined during the cold test, specifically preferably the mean torque values with and without firing of the internal combustion engine. Said power may also be referred to as combustion power, which has been determined mathematically by the method according to the invention on the basis of torque values recorded during the cold test in the fired state and unfired state.

On account of the cylinder-selective determination of the gross power or combustion power, it is possible with the method according to the invention to mathematically determine the power distribution of the diesel engine, specifically to identify weak or strong cylinders.

The power loss can be determined from the mean torque value of the respective cylinder that has been determined in the unfired cold test of the diesel engine. Added up over all the cylinders, this gives the total power loss.

The net power per cylinder is calculated from the difference between gross power per cylinder and the power loss per cylinder. Likewise, the net total power is calculated from the difference between gross total power and total power loss.

The method described above may also be implemented in conjunction with other internal combustion engines, for example spark-ignition engines. The method according to the invention is likewise suitable for internal combustion engines with any desired number of cylinders and also for internal combustion engines without turbochargers. In any case, according to the invention, the power of such internal combustion engines can be indirectly mathematically predetermined with high accuracy and reliability.

What is claimed is:
1. A method for determining the power of an internal combustion engine, comprising:

in conjunction with a cold test, operating the internal combustion engine briefly in a fired state;

determining torque values of the internal combustion engine in said fired state, wherein, during the determination of the torque values, the internal combustion engine is operated with a rotational speed which lies in a narrow rotational speed spectrum below a nominal rotational speed of the internal combustion engine; and from the torque values thus determined, indirectly determining the power of the internal combustion engine mathematically.

2. The method according to claim 1, wherein the power is determined on a cold-test stand in the cold test.

3. The method according to claim 2, wherein the power is determined on the cold-test stand in the cold test subsequently to the cold test of the internal combustion engine in the unfired state.

4. The method according to claim 1, wherein, during the determination of the torque values, the internal combustion engine is operated with a constant rotational speed.

5. The method according to claim 4, wherein, during the determination of the torque values, the internal combustion engine is operated with a constant rotational speed below the nominal rotational speed of the internal combustion engine.

6. The method according to claim 1, wherein no active cooling of the internal combustion engine takes place when operating the internal combustion engine briefly in the fired state.

7. The method according to claim 1, wherein, during the cold test, the internal combustion engine is driven in a dragging manner by another motor, with the motor being used as a starter for starting the internal combustion engine operated briefly in the fired state during the cold test, and the motor remaining coupled to the internal combustion engine during the fired operation of the internal combustion engine during the cold test.

8. The method according to claim 7, wherein the motor is an electric motor.

9. The method according to claim 8, wherein the electric motor is operated in a generative manner as a braking motor during the fired operation of the internal combustion engine during the cold test.

10. The method according to claim 9, wherein, during the generative operation of the electric motor as a braking motor, the torque of the internal combustion engine operated briefly in the fired state during the cold test is determined.

11. The method according to claim 10, wherein, during the determination of the torque during the fired operation of the internal combustion engine, a turbocharger is not operated.

12. The method according to claim 1, wherein, during the fired state, the internal combustion engine is operated with a rotational speed that lies in the region of an idle operating point of the internal combustion engine.

13. The method according to claim 1, wherein, during the fired state, the internal combustion engine is operated with a rotational speed of between 300 and 800 rpm.

14. The method according to claim 1, wherein, subsequently to the cold test, the internal combustion engine is operated briefly in the fired state only if the cold test of the internal combustion engine has yielded that basic functionalities of the internal combustion engine lie within admissible tolerances.

15. The method according to claim 1, wherein predicted power of the internal combustion engine is determined from a mean torque profile, in relation to a crank angle, during the fired and unfired operation of the internal combustion engine during the cold test.

16. The method according to claim 1, wherein net total power of the internal combustion engine is determined indirectly from a mean torque profile.

17. The method according to claim 1, wherein gross total power of the internal combustion engine is determined indirectly from a mean torque profile.

18. The method according to claim 1, wherein power loss of the internal combustion engine is determined from a mean torque profile.

19. The method according to claim 1, wherein the power of the internal combustion engine is determined in a cylinder-selective manner.

20. The method according to claim 19, wherein the cylinder-selective determination of the power of the internal combustion engine is carried out by determining the cylinder-specific differential area between the crank-angle-related measured torque values of the internal combustion engine in the fired and unfired states.

* * * * *